United States Patent [19]
Goldberg et al.

[11] Patent Number: 5,873,044
[45] Date of Patent: Feb. 16, 1999

[54] METHOD AND APPARATUS IN A RADIO COMMUNICATION SYSTEM FOR SYNCHRONIZING TRANSMISSIONS WHILE MAINTAINING FULL USER TRAFFIC

[75] Inventors: Steven Jeffrey Goldberg, Fort Worth; Robert Louis Breeden, Colleyville, both of Tex.

[73] Assignee: Motorola, Inc., Schaumburg, Ill.

[21] Appl. No.: 803,741

[22] Filed: Feb. 21, 1997

[51] Int. Cl.[6] .............................. H04B 7/005; H04B 7/01
[52] U.S. Cl. .......................................... 455/503; 455/67.6
[58] Field of Search ..................................... 455/502, 503, 455/524, 67.6, 67.1; 370/503, 507, 508; 375/356

[56] References Cited

U.S. PATENT DOCUMENTS

| 4,718,109 | 1/1988 | Breeden et al. . | |
|---|---|---|---|
| 5,201,061 | 4/1993 | Goldberg et al. . | |
| 5,257,404 | 10/1993 | Goreham et al. . | |
| 5,261,118 | 11/1993 | Vanderspool et al. . | |
| 5,327,581 | 7/1994 | Goldberg . | |
| 5,361,398 | 11/1994 | Christian et al. | 455/503 |
| 5,416,808 | 5/1995 | Witsaman et al. | 455/503 |

*Primary Examiner*—Nguyen Vo
*Attorney, Agent, or Firm*—R. Louis Breeden

[57] ABSTRACT

A radio communication system (100) synchronizes multiple data streams associated with a network of transmitters (102) while maintaining full user traffic. The transmitters transmit (901) a first portion of the user traffic in a simulcast mode during a first time interval, (104) and transmit (903) a second portion of the user traffic in a non-simulcast mode during a second time interval. A monitor receiver (104) is coupled to the transmitters by radio signals for monitoring (905) the second portion of the user traffic transmitted from selected transmitters to determine transmission delays. A controller (108) is coupled to the monitor receiver for adjusting (907) the data streams to equalize the transmission delays (303).

20 Claims, 5 Drawing Sheets

METHOD AND APPARATUS IN A RADIO COMMUNICATION SYSTEM FOR SYNCHRONIZING TRANSMISSIONS WHILE MAINTAINING FULL USER TRAFFIC

FIELD OF THE INVENTION

This invention relates in general to radio communication systems, and more specifically to a method and apparatus for synchronizing transmissions while maintaining full user traffic.

BACKGROUND OF THE INVENTION

Radio communication systems when designed for specific telecommunications markets, such as messaging and paging, are ordinarily designed to utilize simulcast techniques. Simulcast is a cost effective and fundamental feature required for the wide area delivery of today's messaging protocols to large service areas with thousands of roaming subscriber devices. It allows for the transmission of the protocols to reach into areas and buildings not easily accessible by other technologies, while providing additive signal levels in over-lapping service areas. A fundamental precept is that each transmitter in a region will send data with symbol transitions occurring very close to the same time mark as symbol transitions from adjacent transmitters. Precisely how close is dependent on constraints of the signaling stream utilized, distances between transmitters in the system, tolerable delay spread, error budgets, etc. For the transmitters to meet their portion of the allowable symbol transition tolerance, the time accuracy of the signal leaving the transmitting antenna must be controlled to within tens of microseconds or less.

Present radio communications systems often utilize Global Positioning System (GPS) receivers to provide both transmitter oscillator disciplining for transmitter stability and highly accurate simulcast synchronization for groups of overlapping transmitters. In addition to the use of GPS receivers for accurate timing, other highly accurate timing references have been used for similar purposes. These references include the use of T-Carrier span-line network clock references, Universal Time Coordinated (UTC) signals from High Frequency Single Side Band (HF-SSB) or Long Range Navigation (LORAN) receiver/synchronizers, or timing signals from a Cesium or Rubidium atomic clock reference. It should be noted that to ensure accurate synchronization among multiple over-lapping transmitters, the transmitters preferably use similar types of timing references. Since the above time references are expensive, it is desirable to minimize and/or replace them with less costly solutions.

Thus, what is needed is a method and apparatus for making relative timing adjustments for simulcast transmissions in a cost effective manner. The method and apparatus preferably should be transparent to system operation and equipment variances.

SUMMARY OF THE INVENTION

An aspect of the present invention is a method in a radio communication system for synchronizing a plurality of data streams associated with a plurality of transmitters without interrupting user traffic. The method comprises the steps of transmitting, during a first time interval, a first portion of the user traffic in a simulcast mode to convey information including control information and location request messages intended for subscriber units throughout the radio communication system, and then transmitting, during a second time interval, a second portion of the user traffic in a nonsimulcast mode to send different messages to subscribers in localized portions of the radio communication system. The second portion of the user traffic transmitted from selected ones of the plurality of transmitters is monitored and then used to determine a plurality of transmission delays. Adjustment of the plurality of data streams is then accomplished to equalize the plurality of transmission delays.

Another aspect of the present invention is a radio communication system for synchronizing a plurality of data streams associated with a plurality of transmitters without interrupting user traffic. The radio communication system comprises the plurality of transmitters for transmitting during a first time interval, a first portion of the user traffic in a simulcast mode to convey information including control information and location request messages intended for subscriber units throughout the radio communication system, and for transmitting during a second time interval, a second portion of the user traffic in a non-simulcast mode to send different messages to subscribers in localized portions of the radio communication system. A monitor receiver is coupled to the plurality of transmitters by radio signals for monitoring the second portion of the user traffic transmitted from selected ones of the plurality of transmitters to determine the plurality of transmission delays. A controller is coupled to the monitor receiver for adjusting the plurality of data streams to equalize the plurality of transmission delays.

Another aspect of the present invention is a controller in a radio communication system for synchronizing a plurality of data streams associated with a plurality of transmitters without interrupting user traffic. The controller comprises a processing system coupled to a plurality of transmitters for controlling the plurality of transmitters to transmit, during a first time interval, a first portion of the user traffic in a simulcast mode to convey information including control information and location request messages intended for subscriber units throughout the radio communication system, and to transmit during a second time interval, a second portion of the user traffic in a nonsimulcast mode to send different messages to subscribers in localized portions of the radio communication system. The controller further comprises a communications port coupled to the processing system and coupled to a monitor receiver for cooperating with the monitor receiver to monitor the second portion of the user selected ones of the selected ones of the plurality of transmitters to determine delays. The processing system is programmed to cooperate with the plurality of transmitters and the monitor receiver to adjust a plurality of floating time references according to the plurality of transmission delays to equalize the plurality of transmission delays.

DETAILED DESCRIPTION OF THE DRAWINGS

Figure 1:
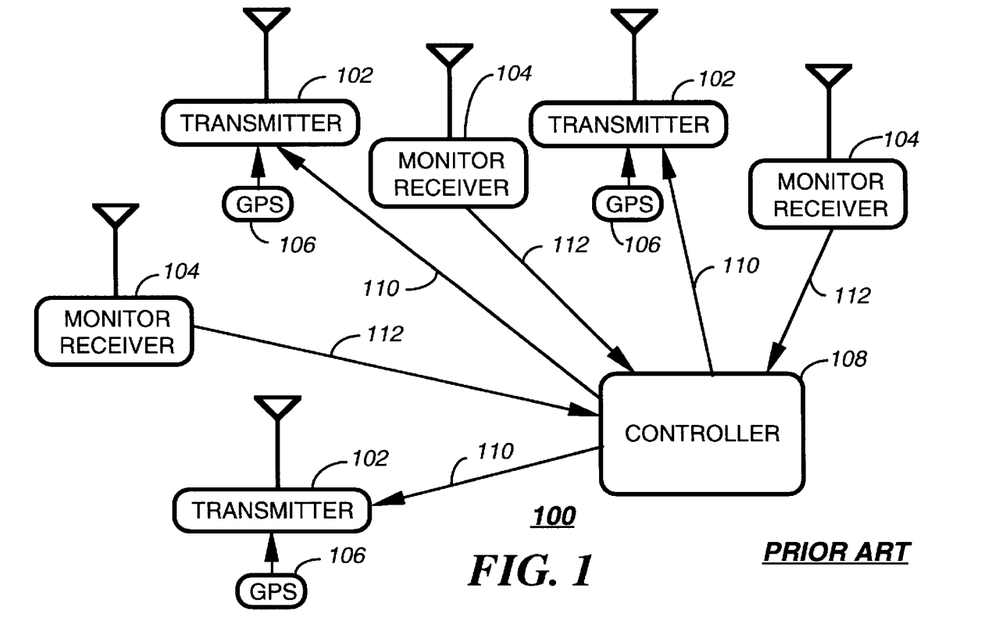
FIG. 1 is an electrical block diagram of a prior art radio communication system.

Referring to FIG. 1, an electrical block diagram depicts a prior art radio communication system 100 comprising a plurality of transmitters 102 coupled by outbound communication links 110 to a controller 108 for controlling the transmitters 102 to transmit messages to portable subscriber units (not shown). The prior art radio communication system 100 further comprises a plurality of monitor receivers 104 coupled by inbound communication links 112 for receiving inbound channel communications from the portable subscriber units. Each of the transmitters 102 is coupled to a Global Positioning Satellite (GPS) receiver 106, which is used for setting the simulcast launch time, and disciplining the local oscillator. The controller 108 batches messages together, and sends them to each transmitter 102 with a specified launch time. When this launch time occurs, the transmitters 102 all send the same data during the simulcast portion of the transmission cycle. As discussed herein above in the Background, the GPS receivers 106 are expensive, and it is thus desired to eliminate them.

For local oscillator disciplining, alternative techniques exist. The alternative techniques include monitoring terrestrial radio time signals, such as the Radio Station WWV signal of the U.S. National Bureau of Standards. Other alternatives include Rubidium clocks and sending a continuous stream of timing ticks over the outbound communication links 110. Simulcast synchronization, however, becomes much more challenging without the GPS receivers 106 at every transmitter 102, and is the subject of the remainder of this disclosure.

Figure 2:
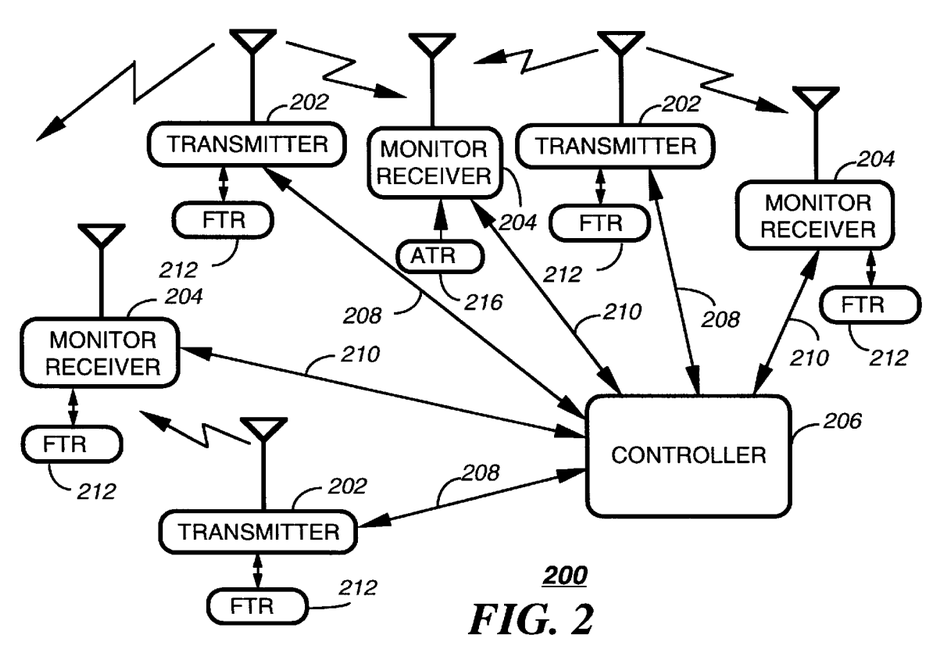
FIG. 2 is an electrical block diagram of a first radio communication system in accordance with the present invention.

Referring to FIG. 2, an electrical block diagram depicts a radio communication system 200 in accordance with the present invention. The radio communication system 200 comprises a plurality of transmitters 202 coupled by outbound communication links 208 to a controller 206 for controlling the transmitters 202 to transmit messages to portable subscriber units (not shown). The radio communication system 200 further comprises a plurality of monitor receivers 204 coupled by inbound communication links 210 for receiving inbound channel communications from the portable subscriber units. The monitor receivers 204 are further for monitoring outbound transmissions from the transmitters 202 to measure and equalize transmission delays in accordance with the present invention, as will be described herein below. The most of the monitor receivers 204 are coupled to conventional floating time references 212 (clocks), which generate a floating time reference for determining the time of receipt of a timing mark used for synchronizing the transmitters 202 as described herein below. Most of the transmitters 202 are also coupled to conventional floating time references 212 for setting the simulcast launch time. Preferably, at least one of the monitor receivers 204 or, alternatively, at least one of the transmitters 202 is coupled to an absolute time reference 216, such as a GPS receiver, so that the overall system timing does not drift significantly in absolute time. As a further alternative, the absolute time reference 216 can be replaced by the less accurate floating time reference 212 in some systems, as discussed further below. The controller 206 batches messages together, and sends them to each transmitter 202 with a specified launch time. When this launch time occurs, the transmitters 202 all send the same data during the simulcast portion of the transmission cycle.

During a second portion of the transmission cycle, the system 200 preferably transmits non-simulcast user data from selected ones of the transmitters 202 on different frequencies, repeating frequency use when the distances between the transmitters 202 are such that the transmissions will not interfere with each other. A primary advantage of the non-simulcast portion of the transmission is to save frequency spectrum through directed transmissions with frequency reuse. An important secondary advantage is that the monitor receivers 204 can also be used in accordance with the present invention to monitor the non-simulcast portion to measure and equalize the transmission delay in preparation for the next simulcast portion. The monitor receivers 204 are instructed by the controller 206 to listen to different frequencies at different times in order to build a profile of reception time marks (preferably synchronization words already present in the protocol) from multiple transmitters 202. The monitor receivers 204 inform the controller 206 of the timing of the time marks, and the timing is compared with the instructed launch times corresponding to messages associated with each received time mark to determine whether and how to adjust the floating time references 212 to keep the transmitters 202 synchronized.

The transmitter 202 is preferably similar to the Nucleus® Orchestra! transmitter manufactured by Motorola, Inc. The hardware of the monitor receiver 204 and the controller 206 is preferably similar to that of the RF-Audience!™ inbound base receiver and the RF-Conductor!™ message distributor, also manufactured by Motorola, Inc. The software of the RF-Audience!™ receiver and the RF-Conductor!™ distributor are modified slightly to perform in accordance with the present invention. The required software modifications can be easily performed by one of ordinary skill in the art, given the teachings of the instant disclosure. It will be appreciated that other similar hardware can be utilized as well for the transmitter 202, the monitor receiver 204, and the controller 206.

The communication protocol used between the controller 206 and the transmitters 202 is preferably similar to Motorola's well-known Outbound Paging Protocol (OPP). The protocol used between the monitor receiver 204 and the controller 206 is preferably similar to Motorola's well-known Inbound Paging Protocol (IPP), modified slightly in accordance with the present invention to accommodate some additional control messages. The required protocol modifications can be easily performed by one of ordinary skill in the art, given the teachings of the instant disclosure. The outbound over-the-air protocol transmitted by the transmitters 202 is preferably a member of Motorola's well-known FLEX™ family of messaging protocols. It will be appreciated that, alternatively, other suitable protocols can be utilized as well to accomplish these communication functions.

In a first embodiment, the device determining the reception times of the time marks is the monitor receiver 204, and the transmission delay of the transmitter is calculated by:

$$T_{delay} = T_{received} - T_{instructed\_launch\_time} - T_{air\_time}$$

$T_{air\_time}$ is estimated based upon the known distance between the transmitters 202 and the monitor receivers 204.

The controller 206 is programmed with a table of $T_{air\_time}$ values corresponding to the combinations of transmitters 202 and monitor receivers 204 that are used in the synchronization process. $T_{instructed\_launch\_time}$ is known precisely to the controller 206. $T_{received}$ is known to the monitor receiver 204 within the accuracy of the monitor time reference. Timing error in the floating time reference 212 introduces a corresponding error in measuring the absolute transmission delay of the transmitters. The timing error does not affect differential transmission delay $$T_{diff}=(T_{delay_1}+T_{error})-(T_{delay_2}+T_{error})=T_{delay_1}-T_{delay_2}$$

between first and second transmitters 202 monitored by the same monitor receiver 204, because the timing error cancels itself in the subtraction process (given sufficient calculation resolution). Thus, a floating time reference can suffice for minimizing the differential delays, i.e. equalizing the transmission delays, of the system 200. Some protocols, however, require transmissions to be synchronized to absolute time. For such systems, the floating time reference 212 preferably should be adjusted at frequent intervals, e.g., every four minutes, to agree with an absolute time reference 216.

To keep the radio communication system 200 synchronized with other similar systems, a GPS or equivalent absolute time reference 216 traceable to a Universal Time Coordinated (UTC) signal is needed at least once at either a transmitter 202 or a monitor receiver 204 of the radio communication system 200. The controller 206 must be aware which transmitter 202 or monitor receiver 204 is so equipped, so that the synchronization process always begins with respect to the absolute time reference 216, and then propagates from there. For example, in the embodiment of the radio communication system 200 depicted in FIG. 2 the absolute time reference 216 is located at one of the monitor receivers 204. The controller 206 preferably instructs that monitor receiver 204 to determine the reception times of timing marks (e.g., existing synchronization words) in non-simulcast portions of the user data to be transmitted by the transmitters 202 within range of the monitor receiver 204. Advantageously, the radio communication system 200 in accordance with the present invention does not have to interrupt the user data transmissions or transmit additional special data over the air to synchronize the transmitters 202.

The monitor receiver 204 measures and reports the reception times of the timing marks to the controller 206. The controller 206 subtracts the instructed launch time and air time corresponding to each transmitter 202 from the corresponding reception time to determine the transmission delay $T_{delay}$, as in the formula herein above. Because $T_{delay}$ primarily represents timing error in the floating time references 212 of the measured transmitters 202, its value can be positive or negative, depending upon the direction of the floating time reference drift. The floating time references 212 of the measured transmitters 202 are then instructed by the controller 206 to adjust their time by an algebraic addition of $T_{delay}$ to their currently set times. As a result of the adjustment, the measured transmitters 202 will be synchronized with one another and with other similar systems. While this adjustment is most important for the periods when simulcast transmissions are occurring, it also serves to improve system performance for synchronization of the portable subscriber units to the system protocol timing during nonsimulcast data transmissions.

Once a transmitter floating time reference has been recalibrated as described above, further non-simulcast transmissions of the transmitter using the recalibrated time reference can be monitored by a monitor receiver 204 having a floating time reference 212. For this case, the measured transmission delay is a result of timing error in the monitor's floating time reference 212. Thus, the monitor floating time reference 212 can be recalibrated by measuring transmissions from a recalibrated transmitter.

There actually are four ways in which absolute timing recalibration can propagate through the system. The four ways are outlined below.

I. Propagating by transmitting from a transmitter synchronized by a transmitter floating time reference, monitoring the transmitter with a monitor receiver clocked by a monitor absolute time reference to determine a measured transmission delay, and adjusting the transmitter floating time reference according to the measured transmission delay to recalibrate the transmitter floating time reference.

II. Propagating by transmitting from a transmitter synchronized by a transmitter absolute time reference, monitoring the transmitter with a monitor receiver clocked by a monitor floating time reference to determine a measured transmission delay, and adjusting the monitor floating time reference according to the measured transmission delay to recalibrate the monitor floating time reference.

III. Propagating by transmitting from a transmitter synchronized by a transmitter floating time reference, monitoring the transmitter with a monitor receiver clocked by a recalibrated monitor floating time reference to determine a measured transmission delay, and adjusting the transmitter floating time reference according to the measured transmission delay to recalibrate the transmitter floating time reference.

IV. Propagating by transmitting from a transmitter synchronized by a recalibrated transmitter floating time reference, monitoring the transmitter with a monitor receiver clocked by a monitor floating time reference to determine a measured transmission delay, and adjusting the monitor floating time reference according to the measured transmission delay to recalibrate the monitor floating time reference.

It will be appreciated that in a very large system more than one absolute time reference 216 can be desirable, so that the recalibration process can be completed more quickly in all parts of the system. Having more than one absolute time reference 216 also helps control cumulative timing errors introduced as the recalibration process propagates through the system. In addition, more than one absolute time reference 216 is required when a system contains isolated groups of transmitters 202 that cannot be monitored by a single monitor receiver 204, as will be described further herein below.

In some systems 200, the delay from the monitor receiver 204 to the controller 206 is reasonably constant for long periods of time. In such systems the reception time calculations can, alternatively, be performed by the controller 108. This allows the monitor receiver 204 to be less complex. The delay equation for this example has an additional term:

$$T_{delay}=T_{received}-T_{instructed\_launch\_time}-T_{air\_time}-T_{return\_path}$$

In this case the last term is the same for each transmitter 202 utilizing any single given monitor receiver 204. Subtracting the values from two different transmitters therefore drops the last term from the equation.

$$T_{differential} = T_{delay1} - T_{delay2} = T_{received1} - T_{received2} - T_{instructed—launch—time1} + T_{instructed—launch—time2} - T_{air—time1} + T_{air—air—time2}$$

For this case, the absolute delay of any one transmitter 202 is unknown to the controller 206, but the differential delay between each pair of transmitters is known. Each transmitter 202 is therefore instructed to adjust its delay by a value which minimizes all differential delays. It will be appreciated that it is possible to have a mixed system where some reception times of the timing marks are determined at the monitor receivers 204 and other reception times of the timing marks are determined at the controller 206. It will be further appreciated that, alternatively, the controller 206 can communicate the instructed launch time to a monitor receiver 204 and that the monitor receiver 204 can then compute the actual transmission delays or differential delays and then communicate the computed values back to the controller 206.

In most systems one monitor receiver 204 will not be capable of receiving from all transmitters 202. In these cases it is only necessary that every group of transmitters 202 associated with a monitor receiver 204, has at least one transmitter 202 which is also capable of reaching a monitor receiver 204 in an adjacent group of transmitters. By being measured by both monitor receivers 204, the system 200 knows the delay difference between the groups. This is then taken into account in the overall delay settings sent to all the transmitters 202.

The delay adjustments performed in the above manner are of course most accurate between transmitters 202 using the same common monitor receiver 204. As measurements move from one monitor receiver 204 to another, the number of intervening calculations will cause a cumulative error possibility. This can be mitigated by averaging the results from more than one sequence of intervening transmitter pairs to set the delay value for any one transmitter 202. Also, as the transmitters 202 become farther apart, the interference effect one will have on another decreases.

Figure 3:
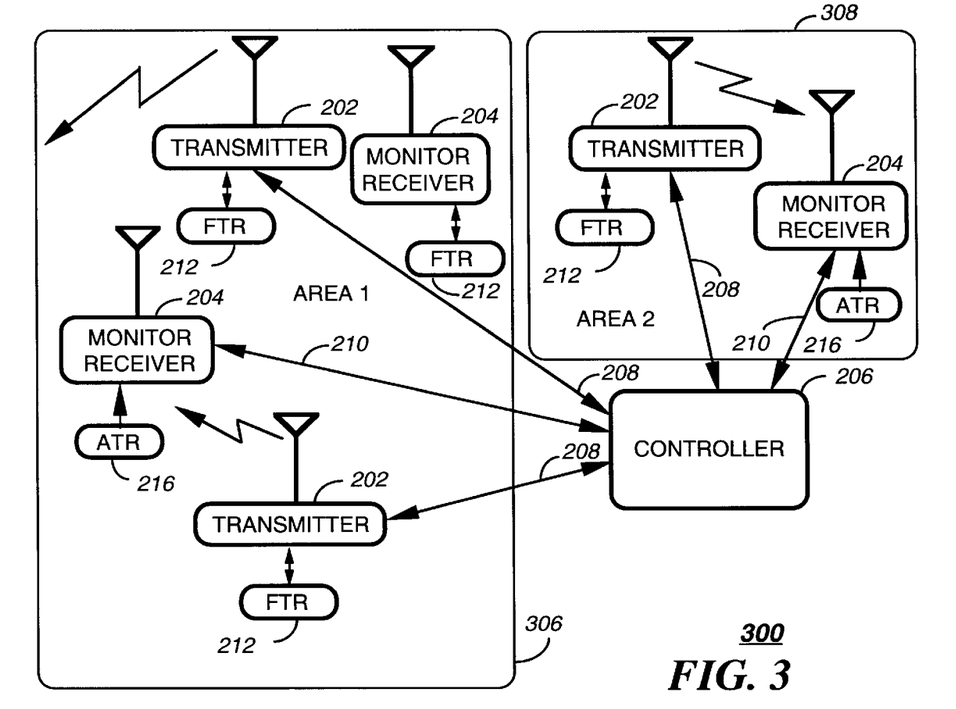
FIG. 3 is an electrical block diagram of a second radio communication system in accordance with the present invention, depicting isolated coverage areas.

Referring to FIG. 3, an electrical block diagram of a radio communication system 300 in accordance with the present invention, depicts isolated coverage areas 306, 308. When a transmitter 202 which has no monitor receiver 204 in common with a transmitter 202 of another group, there is no way in the system 200 to determine the delay difference at the monitor receiver 204. The system 300 is similar to the system 200, the essential difference being the placement of the absolute time reference 216 at one monitor receiver 204 of each isolated group of transmitters 202. In this way the measurements made by each group can be referenced to an absolute time mark, so that meaningful comparisons can be made between the groups.

If the transmission times of the systems 200, 300 become infrequent, there may be sufficient time between measurements for the floating time references 212 to drift excessively. A typical oscillator used at a transmitter is accurate to one part per billion. It would therefore take about sixteen minutes for the floating time references 212 to drift one microsecond. For the preferred FLEX™ family of protocols a transmission occurs at least every four minutes, so the drift time is insignificant. For other protocols it can be necessary to generate traffic artificially whenever a predetermined maximum tolerable drift time is approached.

Figure 4:
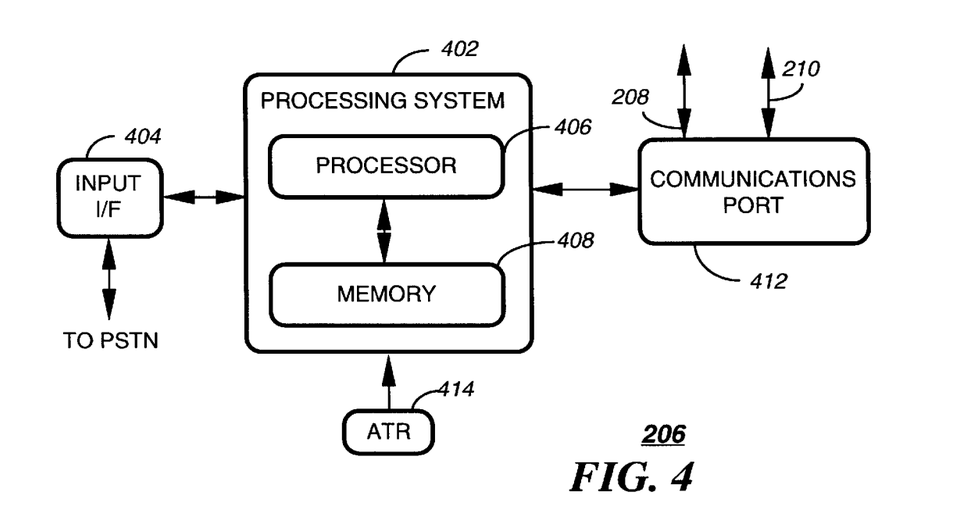
FIG. 4 is an electrical block diagram of a controller in accordance with the present invention.

Referring to FIG. 4, an electrical block diagram depicts the controller 206 in accordance with the present invention.

The controller 206 comprises an input interface 404 preferably coupled to the Public Switched Telephone Network (PSTN) for receiving user traffic comprising messages from message originators. The input interface 404 is coupled to a processing system 402 for processing the user traffic. The processing system comprises a conventional processor 406 and a memory 408 for programming the processing system in accordance with the present invention. The processing system 402 is programmed to control the plurality of transmitters 202 to transmit, during a first time interval, a first portion of the user traffic in a simulcast mode and to transmit during a second time interval, a second portion of the user traffic in a non-simulcast mode. An absolute time reference 414, preferably a GPS receiver, is coupled to the processing system 402 for providing a time signal thereto. The processing system 402 is also coupled to a communications port 412 for monitoring (via the monitor receivers 204 ) the second portion of the user traffic transmitted from selected ones of the plurality of transmitters 202 to determine a plurality of transmission delays. The communication port 412 is coupled to the transmitters 202 and the monitor receivers 204 through the outbound and inbound communication links 208, 210, respectively.

The processing system 402 is programmed to cooperate with the plurality of transmitters 202 and the monitor receivers 204 to adjust the plurality of floating time references 212 according to the plurality of transmission delays to equalize the plurality of transmission delays. The processing system 402 is programmed to cooperate with the monitor receiver 204 to adjust a monitor floating time reference 212 according to a measured transmission delay to recalibrate the monitor floating time reference 212. The processing system 402 is further programmed to adjust the plurality of floating time references such that the plurality of transmission delays are set to a predetermined value. The processing system 402 is also programmed to adjust the transmitter floating time reference 212 according to a measured transmission delay to recalibrate the transmitter floating time reference 212.

Figure 5:
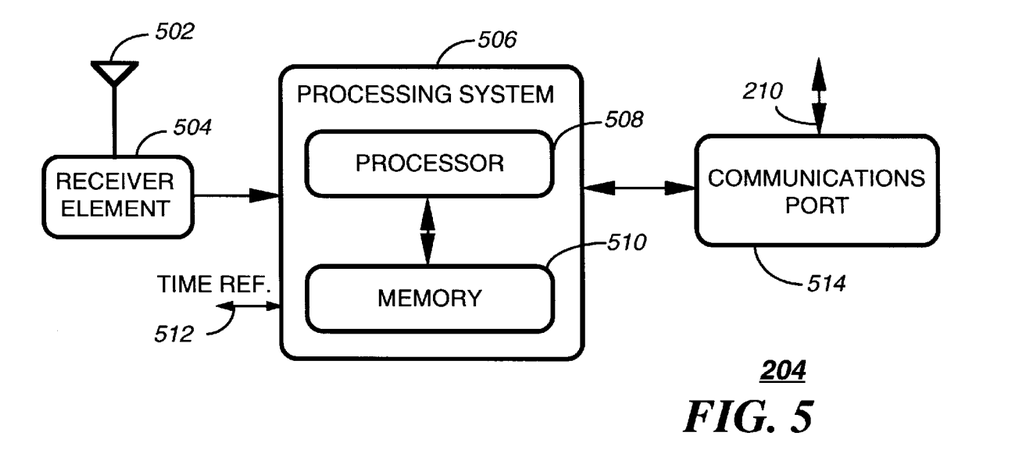
FIG. 5 is an electrical block diagram of a monitor receiver in accordance with a first embodiment of the present invention.

Referring to FIG. 5, an electrical block diagram of the monitor receiver 204 in accordance with a first embodiment of the present invention comprises an antenna 502 for intercepting a transmission from a transmitter 202. The antenna 502 is coupled to a conventional receiver element 504 for demodulating the transmission. The receiver element 504 is coupled to a processing system 506 for processing the transmissions to determine a time of receipt. The processing system 506 comprises a conventional processor 508 and a memory 510 for programming the processing system in accordance with the present invention. A time reference communication port 512 is coupled to the processing system 506 for providing a time signal thereto from one of the time references 212, 216 coupled to the time reference communication port 512. When the floating time reference 212 is the coupled reference, the time reference communication port 512 is also utilized for setting the floating time reference 212 using well-known techniques. The processing system 506 is also coupled to a communications port 514 for cooperating with the controller 206 to monitor the second portion of the user traffic transmitted from selected ones of the plurality of transmitters 202 to determine a plurality of transmission delays.

The processing system 506 is programmed to cooperate with the controller 206 to adjust the monitor floating time reference 212 according to the plurality of transmission delays to equalize the plurality of transmission delays. The processing system 506 is further programmed to determine a plurality of relative times at which a predetermined recurring bit pattern 702 in the second portion of the user traffic is received from the selected ones of the plurality of transmitters 202.

Figure 6:
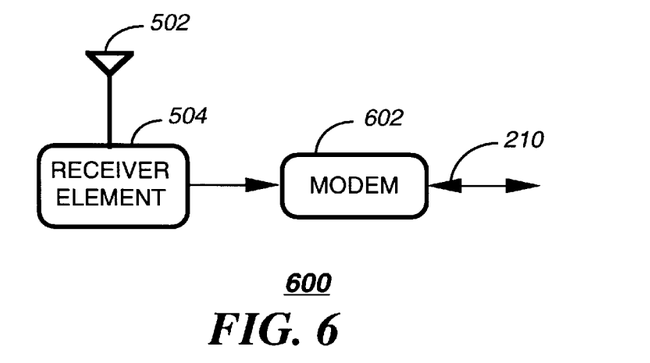
FIG. 6 is an electrical block diagram of a monitor receiver in accordance with a second embodiment of the present invention.

Referring to FIG. 6, an electrical block diagram of a monitor receiver 600 in accordance with a second embodiment of the present invention comprises an antenna 502 for intercepting a transmission from a transmitter 202. The antenna 502 is coupled to a conventional receiver element 504 for demodulating the transmission. The receiver element 504 is coupled to a modem 602 for communicating with the controller 206 over the inbound communication link 210. The modem 602 preferable utilizes a modulator and demodulator specifically designed to produce uniform delay characteristics, similar to the well-known 202T modem. In this embodiment, the monitor receiver 600 does not determine the time of receipt of the timing marks, but merely passes the received data on to the controller 206, which determines the time of receipt. As discussed herein above, the transmission delay of the inbound communication link 210 is added to the measured transmission delay, and thus preferably should be constant over long time periods when used with the monitor receiver 600.

Figure 7:
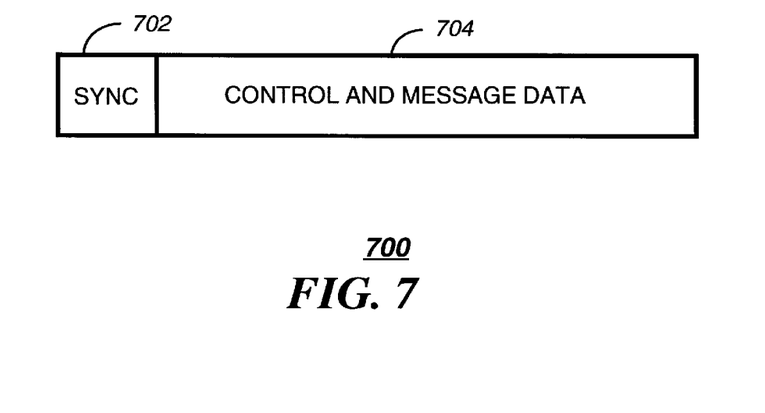
FIG. 7 is a diagram depicting a portion of an outbound protocol in accordance with the present invention.

Referring to FIG. 7, a simplified diagram 700 depicts a portion of an outbound over-the-air protocol in accordance with the present invention. The protocol comprises a synchronization word 702 and control and message data 704. Using well-known techniques, the monitor receiver 204 preferably synchronizes with the synchronization word 702 and then reports to the controller 206 the time of receipt, which is available at the time reference communication port 512. Portions of the control and message data 704 also are reported to the controller 206, so that the controller 206 can identify the transmission and thus the launch time assigned by the controller 206 to the transmission.

The sync word portion of the transmission can determine of the reception time to the resolution of a symbol period. Due to noise there will be jitter on the edges of the symbols. The jitter is removed by considering the received edges of multiple symbols, and assuming the received edges are uniformly random around the actual transmission times. The jitter can therefore be averaged out. While the sync word itself may provide adequate averaging, a more robust implementation preferably uses a larger portion, e.g., all, of the data stream. This is possible even though the received control and message data 704 is random as far as the monitor receiver 204 is concerned. Any detectable symbol transition is another timing mark to improve the overall resolution of the received time of the synchronization word 702.

Figure 8:
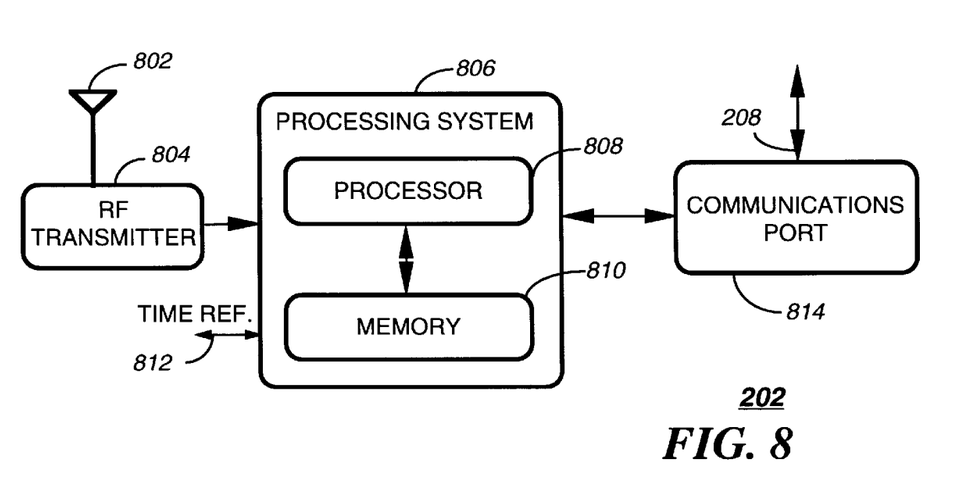
FIG. 8 is an electrical block diagram of a transmitter in accordance with the present invention.

Referring to FIG. 8, an electrical block diagram of the transmitter 202 in accordance with the present invention comprises an antenna 802 for emitting a radio signal. The antenna 802 is coupled to a conventional radio frequency (RF) transmitter 804 for transmitting the radio signal. The RF transmitter 804 is coupled to a processing system 806 for controlling the transmitter 202. The processing system comprises a conventional processor 808 coupled to a conventional memory 810. The memory 810 is programmed in accordance with the present invention. A time reference communication port 812 is coupled to the processing system 806 for providing a time signal thereto from one of the time references 212, 216. When the floating time reference 212 is the coupled time reference, the time reference communication port 812 is also utilized for setting the floating time reference 212 using well-known techniques. A communications port 814 is coupled to the processing system for communication with and control by the controller 206 through the outbound communication link 208.

The processing system 806 is programmed to cooperate with the controller 206 to transmit, during a first time interval, a first portion of the user traffic in a simulcast mode, and to transmit, during a second time interval, a second portion of the user traffic in a non-simulcast mode. The processing system 806 is further programmed to cooperate with the controller 206 to adjust the transmitter floating time reference 212 according to the plurality of transmission delays to equalize the plurality of transmission delays. The processing system 806 is further programmed to cooperate with the controller 206 to adjust the transmitter floating time reference 212 according to the measured transmission delay to recalibrate the transmitter floating time reference.

Figure 9:
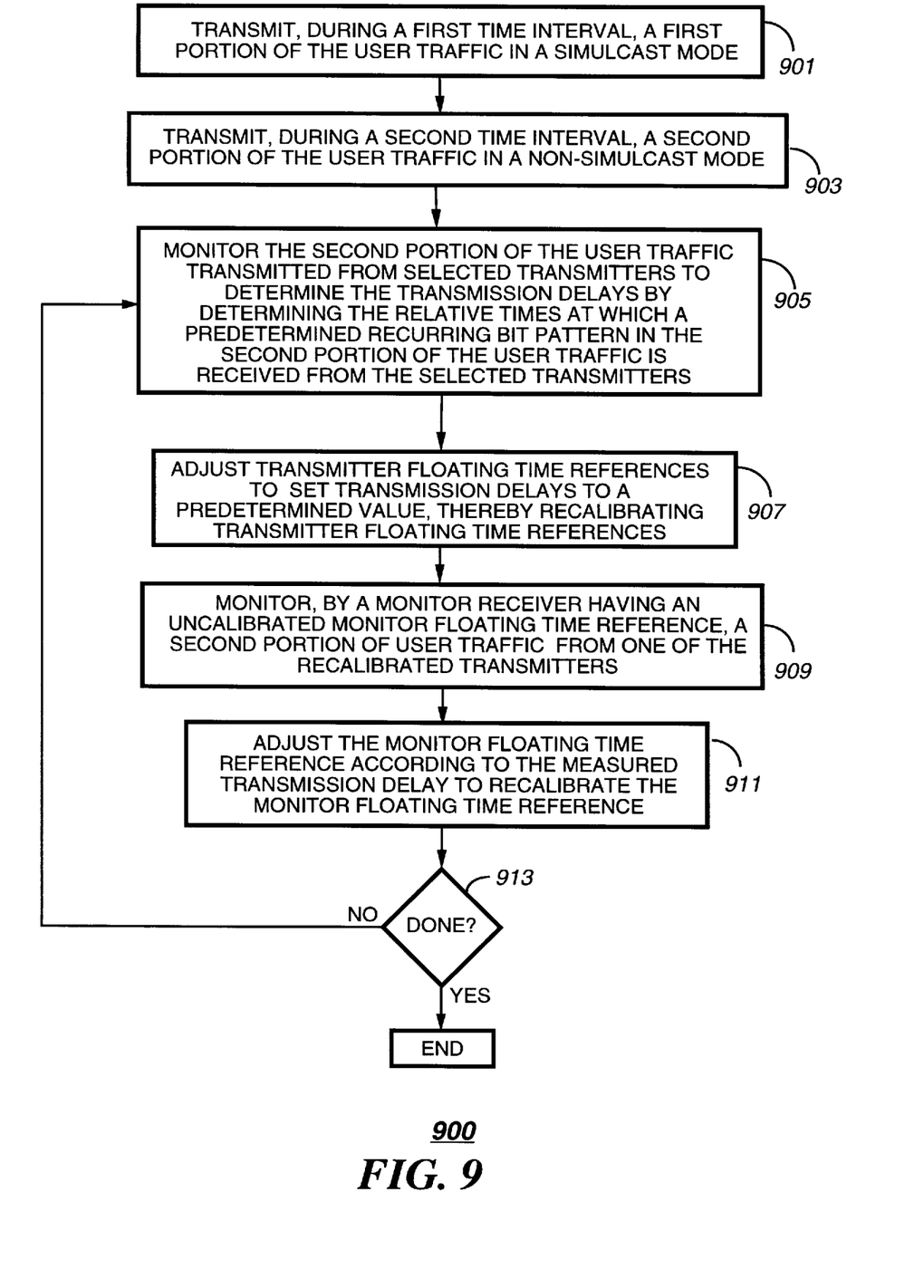
FIG. 9 is a flow chart depicting operation of the radio communication system in accordance with the present invention.

Referring to FIG. 9, a flow chart 900 depicts operation of the radio communication system 200 in accordance with the present invention. The flow begins with the system 200 transmitting 901, during a first time interval, a first portion of the user traffic in a simulcast mode. This is done, for example, to convey information such as control information intended for subscriber units throughout the system. The simulcast mode transmissions can also include location request messages to determine the locations of portable subscriber units for which messages are ready to be sent in the following non-simulcast mode transmission. Next, the system 200 transmits 903, during a second time interval, a second portion of the user traffic in a non-simulcast mode. This is done, for example, to send different individual messages to specific, localized portions of the system. The second portion of the user traffic from selected transmitters 202, e.g., transmitters within range, are monitored 905 by a monitor receiver 204 controlled by the controller 206, which preferably selects as a starting point a monitor receiver 204 having a monitor absolute time reference 216. The monitor receiver 204 and the controller 206 determine transmission delays of the selected transmitters by determining the relative time at which a predetermined recurring bit pattern, e.g., sync, is received from each transmitter. The relative time is communicated from the monitor receiver 204 to the controller 206, which calculates the transmission delay. The controller 206 then cooperates with the selected transmitters 202 to adjust 907 the transmitter floating time references 212 to set the transmission delays to a predetermined value, e.g., zero, thereby recalibrating the transmitter floating time references and equalizing the transmission delays of the selected transmitters 202.

Next, one or more monitor receivers 204 within range of the recalibrated transmitters 202 and having an uncalibrated floating time reference, monitor 909 the second portion of the user traffic from the recalibrated transmitters 202. As before, the monitor receiver 204 measures and reports the time of receipt of the predetermined recurring bit pattern. The controller 206 and the monitor receiver 204 then cooperate to adjust 911 the monitor floating time reference 212 according to the measured transmission delay, thereby recalibrating the monitor floating time reference 212. At step 913 the controller 206 checks whether all floating time references 212 within the system 200 have been recalibrated. If so, the process ends. If not, the flow returns to step 905 to monitor more transmitters, using the recalibrated monitor(s). In this manner, the recalibration process propagates through the system.

Thus, it should be clear that the present invention advantageously provides a method and apparatus for making relative timing adjustments for simulcast transmissions in a cost effective manner. The method and apparatus are transparent to system operation and equipment variances, requiring no interruption of user traffic and no timing signals other than synchronization signals already present in the over-the-air communication protocol.

It will be appreciated by one of ordinary skill in the art that the disclosed invention can be modified in numerous ways and can assume many embodiments other than the embodiments specifically set out and described above. Accordingly, it is intended that the appended claims cover all modifications which fall within the true spirit and scope of the invention.

What is claimed is:

1. A method in a radio communication system for synchronizing a plurality of data streams associated with a plurality of transmitters without interrupting user traffic, the method comprising the steps of:

transmitting, during a first time interval, a first portion of the user traffic in a simulcast mode to convey information including control information and location request messages intended for subscriber units throughout the radio communication system;

transmitting, during a second time interval, a second portion of the user traffic in a non-simulcast mode to send different messages to subscribers in localized portions of the radio communication system;

monitoring the second portion of the user traffic transmitted from selected ones of the plurality of transmitters to determine a plurality of transmission delays; and adjusting a plurality of floating time references according to the plurality of transmission delays to equalize the plurality of transmission delays.

2. The method of claim 1, wherein the adjusting step comprises the step of adjusting a monitor floating time reference utilized to determine a transmission delay, the adjusting performed in accordance with the transmission delay.

3. The method of claim 1, wherein the monitoring step comprises the step of determining a plurality of relative times at which a predetermined recurring bit pattern in the second portion of the user traffic is received from the selected ones of the plurality of transmitters.

4. The method of claim 1, wherein the adjusting step comprises the step of adjusting the plurality of floating time references such that the plurality of transmission delays are set to a predetermined value.

5. The method of claim 1, wherein the step of transmitting the second portion of the user traffic comprises the step of transmitting from a transmitter synchronized by a transmitter floating time reference, and wherein the monitoring step comprises the step of monitoring said transmitter with a monitor receiver clocked by a monitor absolute time reference to determine a measured transmission delay, and wherein the adjusting step comprises the step of adjusting the transmitter floating time reference according to the measured transmission delay to recalibrate the transmitter floating time reference.

6. The method of claim 1, wherein the step of transmitting the second portion of the user traffic comprises the step of transmitting from a transmitter synchronized by a transmitter absolute time reference, and wherein the monitoring step comprises the step of monitoring said transmitter with a monitor receiver clocked by a monitor floating time reference to determine a measured transmission delay, and wherein the adjusting step comprises the step of adjusting the monitor floating time reference according to the measured transmission delay to recalibrate the monitor floating time reference.

7. The method of claim 1, wherein the step of transmitting the second portion of the user traffic comprises the step of transmitting from a transmitter synchronized by a transmitter floating time reference, and wherein the monitoring step comprises the step of monitoring said transmitter with a monitor receiver clocked by a recalibrated monitor floating time reference to determine a measured transmission delay, and wherein the adjusting step comprises the step of adjusting the transmitter floating time reference according to the measured transmission delay to recalibrate the transmitter floating time reference.

8. The method of claim 1, wherein the step of transmitting the second portion of the user traffic comprises the step of transmitting from a transmitter synchronized by a recalibrated transmitter floating time reference, and wherein the monitoring step comprises the step of monitoring said transmitter with a monitor receiver clocked by a monitor floating time reference to determine a measured transmission delay, and wherein the adjusting step comprises the step of adjusting the monitor floating time reference according to the measured transmission delay to recalibrate the monitor floating time reference.

9. A radio communication system for synchronizing a plurality of data streams associated with a plurality of transmitters without interrupting user traffic, the radio communication system comprising:

the plurality of transmitters for transmitting, during a first time interval, a first portion of the user traffic in a simulcast mode to convey information including control information and location request messages intended for subscriber units throughout the radio communication system, and for transmitting, during a second time interval, a second portion of the user traffic in a non-simulcast mode to send different messages to subscribers in localized portions of the radio communication system;

a monitor receiver for cooperating with a controller to monitor the second portion of the user traffic transmitted from selected ones of the plurality of transmitters to determine a plurality of transmission delays; and the controller coupled to the plurality of transmitters and coupled to the monitor receiver for cooperating with the plurality of transmitters and the monitor receiver to adjust a plurality of floating time references according to the plurality of transmission delays to equalize the plurality of transmission delays.

10. The radio communication system of claim 9, further comprising a monitor floating time reference utilized to determine a transmission delay, wherein the controller and the monitor receiver are programmed for cooperating to adjust the monitor floating time reference in accordance with the transmission delay.

11. The radio communication system of claim 9, wherein the monitor receiver is programmed to determine a plurality of relative times at which a predetermined recurring bit pattern in the second portion of the user traffic is received from the selected ones of the plurality of transmitters.

12. The radio communication system of claim 9, wherein the controller is programmed to adjust the plurality of floating time references such that the plurality of transmission delays are set to a predetermined value.

13. The radio communication system of claim 9, further comprising:

a transmitter floating time reference; and a monitor absolute time reference, and wherein a transmitter of the plurality of transmitters is synchronized by the transmitter floating time reference, and wherein the monitor receiver is clocked by a monitor absolute time reference for determining a measured transmission delay, and wherein the controller is programmed to adjust the transmitter floating time reference according to the measured transmission delay to recalibrate the transmitter floating time reference.

14. The radio communication system of claim 9, further comprising:

a transmitter absolute time reference; and a monitor floating time reference, and wherein a transmitter of the plurality of transmitters is synchronized by the transmitter absolute time reference, and wherein the monitor receiver is clocked by the monitor floating time reference for determining a measured transmission delay, and wherein the controller is programmed to adjust the monitor floating time reference according to the measured transmission delay to recalibrate the monitor floating time reference.

15. The radio communication system of claim 9, further comprising:

a transmitter floating time reference; and a monitor floating time reference that has been recalibrated by the controller to produce a recalibrated monitor floating time reference, and wherein a transmitter of the plurality of transmitters is synchronized by the transmitter floating time reference, and wherein the monitor receiver is clocked by the recalibrated monitor floating time reference for determining a measured transmission delay, and wherein the controller is programmed to adjust the transmitter floating time reference according to the measured transmission delay to recalibrate the transmitter floating time reference.

16. The radio communication system of claim 9, further comprising:

a transmitter floating time reference that has been recalibrated by the controller to produce a recalibrated transmitter floating time reference; and a monitor floating time reference, and wherein a transmitter of the plurality of transmitters is synchronized by the recalibrated transmitter floating time reference, and wherein the monitor receiver is clocked by the monitor floating time reference for determining a measured transmission delay, and wherein the controller is programmed to adjust the monitor floating time reference according to the measured transmission delay to recalibrate the monitor floating time reference.

17. A controller in a radio communication system for synchronizing a plurality of data streams associated with a plurality of transmitters without interrupting user traffic, the controller comprising:

a processing system coupled to a plurality of transmitters for controlling the plurality of transmitters to transmit, during a first time interval, a first portion of the user traffic in a simulcast mode to convey information including control information and location request messages intended for subscriber units throughout the radio communication system, and to transmit during a second time interval, a second portion of the user traffic in a non-simulcast mode to send different messages to subscribers in localized portions of the radio communication system; and a communications port coupled to the processing system and coupled to a monitor receiver for cooperating with the monitor receiver to monitor the second portion of the user traffic transmitted from selected ones of the plurality of transmitters to determine a plurality of transmission delays, wherein the processing system is programmed to cooperate with the plurality of transmitters and the monitor receiver to adjust a plurality of floating time references according to the plurality of transmission delays to equalize the plurality of transmission delays.

18. The controller of claim 17, wherein the processing system is programmed to cooperate with the monitor receiver to adjust a monitor floating time reference in accordance with a measured transmission delay determined from the monitor floating time reference.

19. The controller of claim 17, wherein the processing system is programmed to adjust the plurality of floating time references such that the plurality of transmission delays are set to a predetermined value.

20. The controller of claim 17, wherein the processing system is programmed to adjust a transmitter floating time reference according to a measured transmission delay to recalibrate the transmitter floating time reference.

* * * * *